(12) United States Patent
Joshi et al.

(10) Patent No.: US 11,392,758 B2
(45) Date of Patent: Jul. 19, 2022

(54) VISUAL PARSING FOR ANNOTATION EXTRACTION

(71) Applicant: Microsoft Technology Licensing, LLC, Redmond, WA (US)

(72) Inventors: Manish Joshi, Bangalore (IN); Rupam Basu, Bangalore (IN); Shibnath Mukherjee, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/888,911

(22) Filed: Jun. 1, 2020

(65) Prior Publication Data

US 2021/0326515 A1   Oct. 21, 2021

(51) Int. Cl.

| | | |
|---|---|---|
| *G06F 40/00* | (2020.01) | |
| *G06F 40/169* | (2020.01) | |
| *G10L 15/26* | (2006.01) | |
| *G06F 40/134* | (2020.01) | |
| *G06F 16/9535* | (2019.01) | |
| *G06F 16/958* | (2019.01) | |
| *G06V 20/40* | (2022.01) | |
| *G06V 30/414* | (2022.01) | |
| *G06V 30/10* | (2022.01) | |

(52) U.S. Cl.
CPC ........ *G06F 40/169* (2020.01); *G06F 16/9535* (2019.01); *G06F 16/986* (2019.01); *G06F 40/134* (2020.01); *G06V 20/46* (2022.01); *G06V 30/414* (2022.01); *G10L 15/26* (2013.01); *G06V 30/10* (2022.01)

(58) Field of Classification Search
CPC .... G06F 40/169; G06F 40/134; G06F 16/986; G06K 9/00463; G06K 9/00744
See application file for complete search history.

(56) References Cited

U.S. PATENT DOCUMENTS 6,754,873 B1 * 6/2004 Law ................... G06F 16/951
                                                           715/208
9,779,065 B1 * 10/2017 Lee .................... G06F 16/951
(Continued)

OTHER PUBLICATIONS

VIPS: a Vision-based Page Segmentation Algorithm, by Deng Cai et al., 29 pages, Nov. 2003 (Year: 2003).*
(Continued)

*Primary Examiner* — Scott T Baderman
*Assistant Examiner* — Barbara M Level
(74) *Attorney, Agent, or Firm* — Calfee, Halter & Griswold LLP

(57) ABSTRACT

Embodiments of the disclosure extract annotations from web pages. The annotations are combined with search results and/or advertisements to allow the user to better understand the content of the search result or advertisement landing web page. A visual snapshot of the web page is taken. Visual processing extracts information from the visual representation. The HTML for the web page is also analyzed and various pieces of information extracted. The information from the visual processing is combined with the information extracted from the HTML. The combined information is evaluated and information for the annotations are selected. The annotations are then combined with the search results and/or advertisements.

20 Claims, 6 Drawing Sheets

(56) References Cited

U.S. PATENT DOCUMENTS

| | | | |
|---|---|---|---|
| 2010/0080411 A1* | 4/2010 | Deliyannis | G06F 16/951 382/100 |
| 2010/0092088 A1* | 4/2010 | Roman | G06F 16/93 382/182 |
| 2012/0030014 A1* | 2/2012 | Brunsman | G06Q 30/0251 705/14.49 |
| 2012/0030015 A1* | 2/2012 | Brunsman | G06Q 30/0251 705/14.49 |
| 2012/0323888 A1* | 12/2012 | Osann, Jr. | G06F 16/248 707/722 |
| 2014/0380142 A1* | 12/2014 | Mikutel | G06F 9/451 715/234 |
| 2015/0058355 A1* | 2/2015 | Naqvi | G06F 16/328 707/746 |
| 2015/0296228 A1* | 10/2015 | Chen | G06F 16/78 725/34 |
| 2016/0117292 A1* | 4/2016 | Lee | G06F 16/9577 715/234 |
| 2018/0004754 A1* | 1/2018 | Lin | G06F 16/958 |
| 2018/0293030 A1* | 10/2018 | Sen | H04N 1/2369 |
| 2018/0322339 A1* | 11/2018 | Cohen | G06K 9/627 |
| 2021/0042393 A1* | 2/2021 | Ishikawa | G06K 9/00456 |

OTHER PUBLICATIONS

Wikipedia Optical Character Recognition Mar. 8, 2018 retrieved https://en.wikipedia.org/wiki/Optical_character_recognition (Year: 2018).*

Wikipedia Speech Recognition Mar. 24, 2018 retrieved https://en.wikipedia.org/wiki/Speech_recognition. (Year: 2018).*

Wikipedia Transcription Mar. 10, 2020 retrieved https://en.wikipedia.org/wiki/Transcription. (Year: 2020).*

* cited by examiner

VISUAL PARSING FOR ANNOTATION EXTRACTION

FIELD

This application relates generally to search techniques. More specifically, this application relates to annotations extracted to web pages to enrich search results.

BACKGROUND

Annotations bridge the gap between a user's search query and search results produced by the query. They are machine generated text added to a query result to enhance a user's understanding of what the user will find when they click on the search result to visit the page. In another context, annotations can be added to the basic advertisement copy provided by advertisers to enhance "clickability" of the advertisement. In both of these contexts, the annotations allow a user to get a sense for the information they will find if they click on a search result or advertisement link.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

The traditional method of extracting annotations relies on extracting content using the structure of a web page's HTML DOM (Document Object Model) tree. The extracted information can then be processed, and annotations identified from the extracted information.

However, dynamic web technologies, Cascading Style Sheets (CSS), Javascript, and so forth that pervade current HTML source code makes extracting relevant information difficult. Use of these technologies mean that the HTML DOM tree generally contains insufficient information about the structure of the web page. For example, it is difficult to extract much information from pages that contain a large number of players, videos, and images. Although the rendered pages make perfect sense to users, the traditional methods of analyzing the HTML DOM to extract annotations are rendered largely useless.

Embodiments of the present disclosure utilize a visual snapshot of a web page as well as the HTML DOM tree to extract annotations from the web page. Visual processing of the visual snapshot extracts information from visual elements such as video, images, and so forth that would otherwise be unavailable to be used as part of the annotations. Additionally, placement on the page gives clues to information that the web page publisher considers important. The information extracted from the visual processing is combined with information extracted from the HTML DOM tree. The combined information is then further processed to extract information for the annotations.

These and other aspects are explained more fully below.

Description

Figure 1:
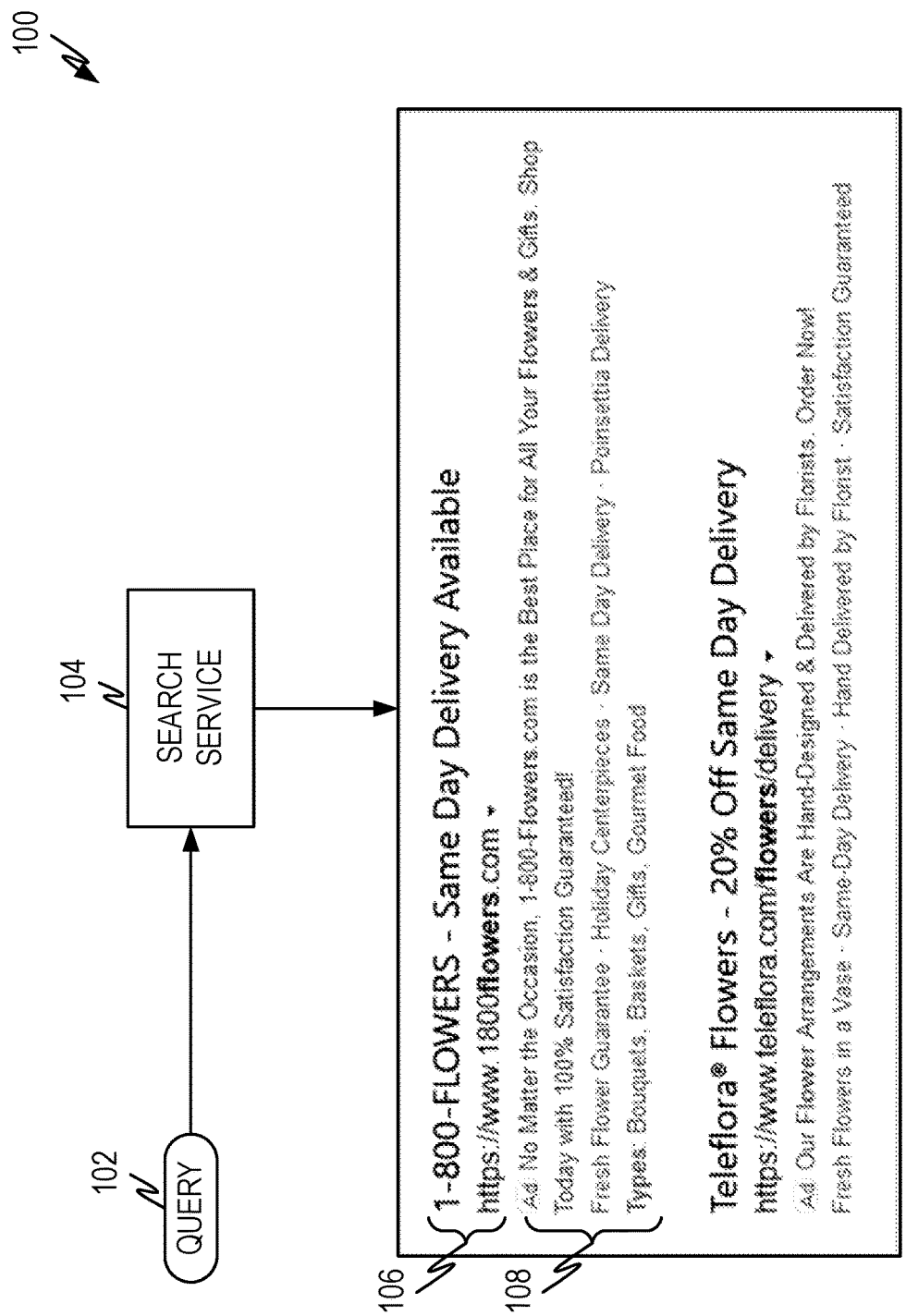
FIG. 1 illustrates an example of annotations to search results or advertisements.

FIG. 1 illustrates an example of annotations to search results or advertisements, shown generally as 100. A query 102 is submitted to a search service 104 which returns a set of search results. In many search services, advertisements are also presented as part of the search results. Annotations are text or other information that fills the gap between a user's search query and the search results. Annotations are typically explanatory or other text that is extracted from the web page to give the user an indication of what information is contained on the web page.

Thus, the search result and/or advertisement may comprise a title and link 106. Additional information provided to the user 108 is referred to as an annotation. In the case of advertisements, a business (or other entity purchasing the advertisement) may provide a minimal set of advertisement copy. However, the advertisement copy is often not sufficient to describe what the user will find if she follows the link to the web page. For example, the advertisement copy in the illustrated example of FIG. 1 may be "No matter what the occasion, 1-800-Flowers.com is the best place for all your flowers & gifts." Other than a bold claim of being "the best place," there is little real information provided to the user in the advertisement copy.

Annotations comprising information extracted from the web page (e.g., the landing page for 1-800-Flowers.com) can provide the user with more information as to what the user will find should they choose to follow the link. Thus, embodiments of the present disclosure can extract information such as the information shown in FIG. 1: "Fresh flower guarantee, Holiday centerpieces, Same day delivery, Poinsettia delivery" and "Types: Bouquets, Baskets, Gifts, Gourmet Food." This additional information, extracted from the web page itself, helps the user know what the web page contains.

Annotations can comprise any information that can be extracted from the web page corresponding to the search result. For example, web pages that correspond to search results often have links to other web pages or other activatable controls. The text associated with these can be extracted as annotations. Additionally, text contained in both the HTML and an image of the web page can be extracted and included as annotations.

Thus, annotations produced by embodiments of the present disclosure provide users with more information to allow them to decide whether to visit web pages or not. In tests using annotations provided by embodiments of the present disclosure, click through rates were increased by annotations produced according to embodiments of the present disclosure.

Figure 2:
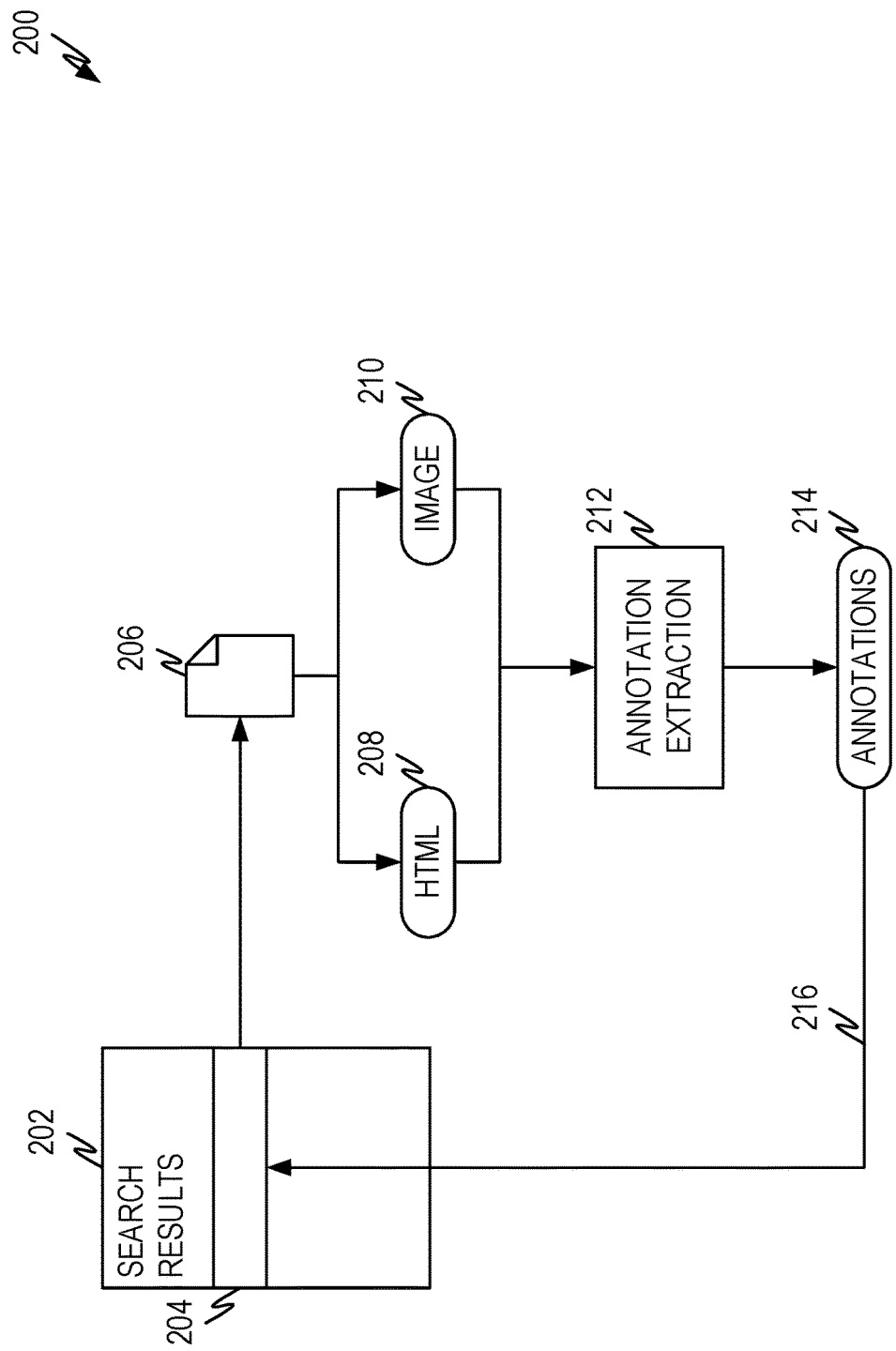
FIG. 2 illustrates a high level architecture diagram according to some aspects of the present disclosure.

FIG. 2 illustrates a high level architecture diagram, shown generally as 200, according to some aspects of the present disclosure. Search results 202 are returned from a search engine. Some of the search results can comprise advertisements. To extract annotations from a search result 204, the corresponding web page 206 is accessed.

Two aspects are extracted from the web page 206. The HTML 208 such as the HTML DOM is extracted from the web page 206. Additionally, an image snapshot 210 of the web page 106 is also extracted from the web page. The image snapshot 210 can be extracted by capturing an image of the rendered web page 206.

Both the HTML 208 and the image 210 are processed by the annotation extraction 212 to extract information from both the HTML 208 and the image 210. The information extracted from both the HTML 208 and the image 210 are combined, filtered, and so forth in order to identify one or more annotations from the web page 206.

The annotations are added to the search result 204 as shown by 216 in order to enrich the search result and let the user better understand what the user will find if the user follows the search result link 204 to the corresponding web page 206.

It is difficult to find out what information the publisher believes is important just by examining the DOM of the HTML page. Thus, the image 210 is used in additional to the HTML in order to produce annotations for the web page.

Figure 3:
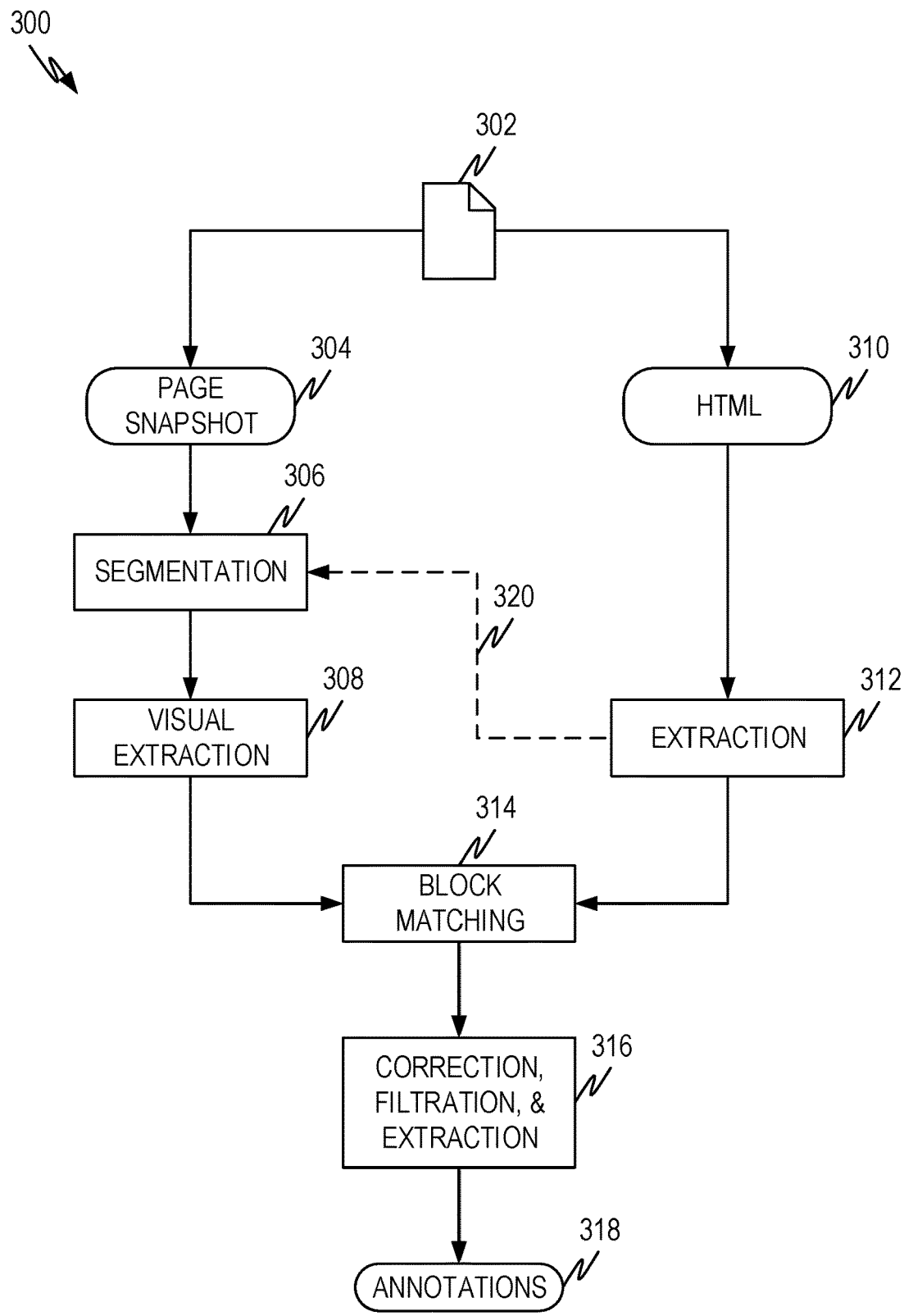
FIG. 3 illustrates a flow diagram according to some aspects of the present disclosure.

FIG. 3 illustrates a flow diagram, shown generally as 300, according to some aspects of the present disclosure. In order to extract annotations according to some embodiments of the present disclosure, the web page 302 corresponding to a search result is accessed. The search result can be an advertisement in some embodiments. In other embodiments, the search result can be a non-advertising type of result.

In some embodiments of the present disclosure, two different processing paths process different representations of the web page 302. Illustrated on the left is the processing path for an image representation of the web page 302. Illustrated on the right is the processing path for the HTML representation of the web page 302, such as the HTML DOM of the web page 302. Each of these paths are explained below.

Operation 304 extracts an image representation of the web page 302. The image representation can be obtained by rendering the web page and taking an image snapshot of the result. The image often contains information that is often difficult to discern from the HTML DOM of the web page. For example, the location in the DOM does not correspond to importance of a particular element on the page. Something that is to be rendered at the top of the page can be at the bottom of the DOM. Items and information that are located at the top of the web page are often more important than things that are located at the bottom of the web page. It is the items and information at the top of the page that the publisher wishes the user to see first. Items at the top of the page often include branding information to allow the user to identify the content publisher, images or other important information, navigation links, a search box to allow the user to search the publishers site content, login controls to allow the user to log into an account, and so forth.

As noted by this list, the top of the page includes information that: 1) is important information the publisher wishes to communicate to the user; and 2) located at the top of the page for the convenience of the user so they do not have to hunt for things (e.g., searching the website, logging into an account, and so forth). As explained below, the information that is located at the top for the convenience of the user is filtered out so that the information the publisher feels is important remains.

Additionally, web pages can be very rich in visual content (images, videos, and so forth) and such visual content is not available in the DOM. Thus, there are a lot of visual clues and content that are missed when examining the DOM and using only the DOM to extract annotations. Such visual content often contains information the publisher feels is important (as opposed to information that is located at the top of the page for convenience).

Operation 306 segments the snapshot into regions that can be examined for important information. Segmentation can be performed in several ways. In one embodiment, segmentation is performed by examining white space on the image snapshot. In this approach, whitespace can be identified, for example, by evaluating the image and identifying a predominant background color. There are known methods to identify background color of an image and these can be used. Because the background color can change over the totality of the image (e.g., where several visual images are located on the image and each image has a different background color). Thus, changing background color can give hints as to where different segments are located on the page.

In this approach, the background color is identified and regions clustered together by background color. Each cluster can then represent a different segment.

Figure 4:
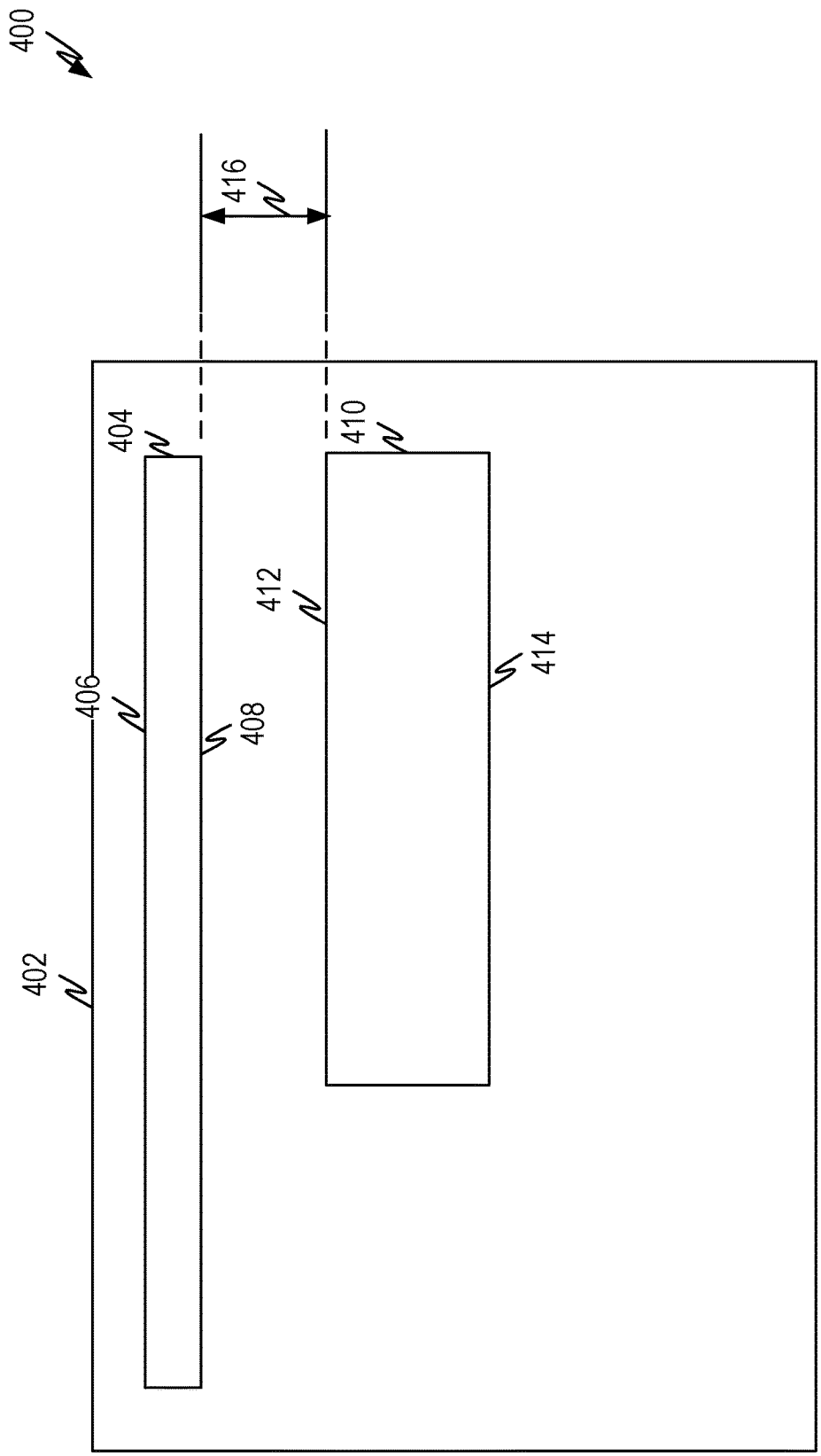
FIG. 4 illustrates an example of snapshot segmentation according to some aspects of the present disclosure.

Turning for a moment to FIG. 4, an alternative approach taken by some embodiments is presented. FIG. 4 illustrates an example of snapshot segmentation, shown generally as 400, according to some aspects of the present disclosure. The method illustrated in FIG. 4 begins at an edge, such as the top edge 402 of the web page and looks for whitespace and non-whitespace elements. In some embodiments, the image can be converted to black and white with the text in black and other non-text content in white. The elements are combined into a segment when the whitespace between non-whitespace elements is below a threshold amount.

Consider two non-whitespace elements, 404 and 410. The first non-whitespace element 404 has a first edge 406 closest to the top edge 402 and a second edge 408 that is farther away from the top edge 402. The second non-whitespace element 410 has a first edge 412 that is closest to the top edge 402 and a second edge 414 farther away from the top edge 402. The method compares the edges closest to each other (e.g., 408 and 412) and compares the amount of whitespace between them 416. If the amount of whitespace 416 falls below a threshold amount, the two regions 404 and 410 are combined into the same segment. Otherwise, the two regions 404 and 410 are considered to be different segments.

In some embodiments, the left and/or right edge, can be used to determine the left-right extents of the segments using the same methodology. In some embodiments only one edge is used (e.g., top or left or right) and the segments are considered to span the entire width or length of the web page as the case may be. In other embodiments two edges (e.g., top and left, top and right) so that the extent of the segment in two directions can be determined.

Figure 5:
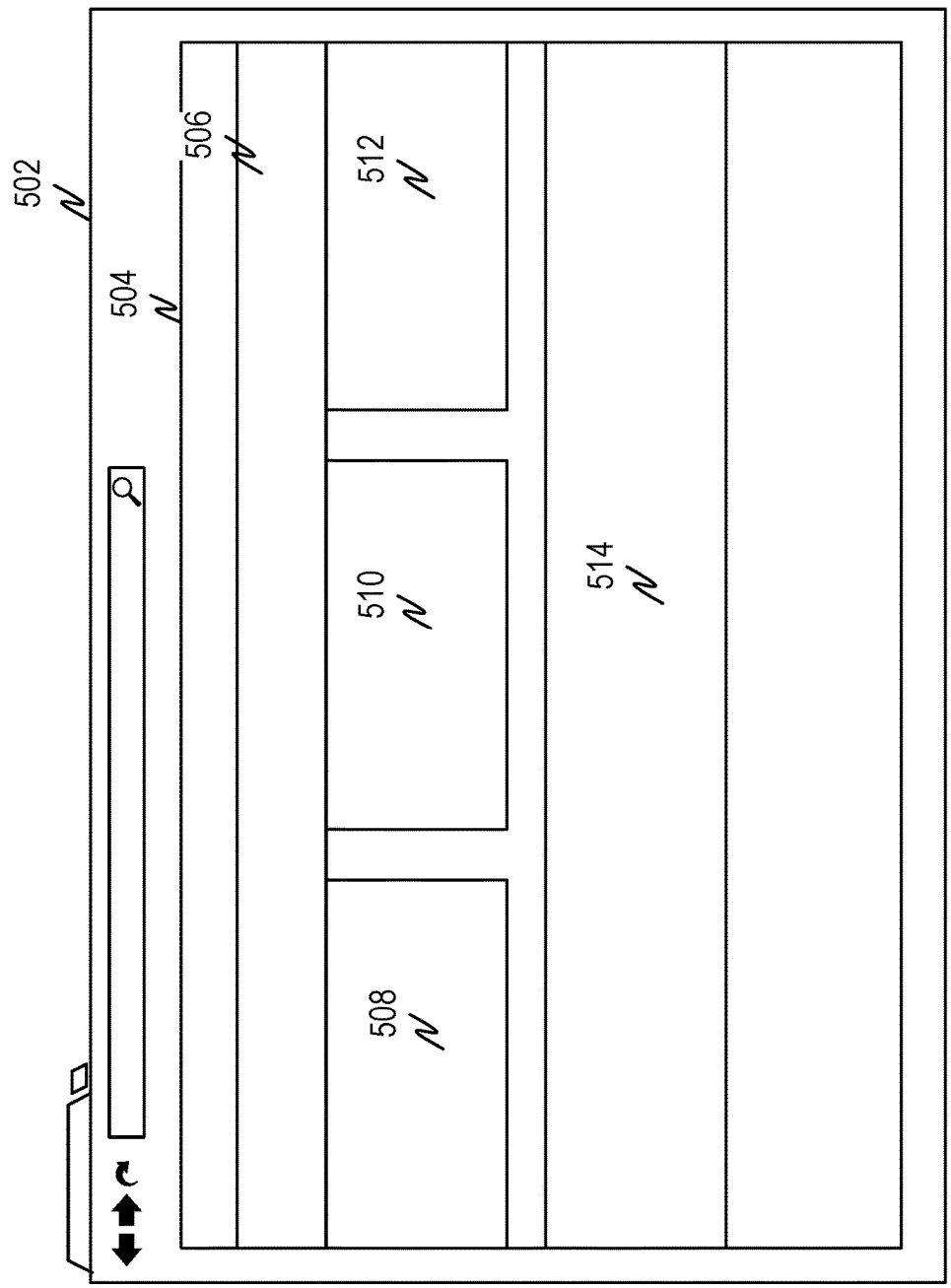
FIG. 5 illustrates an example of snapshot segmentation according to some aspects of the present disclosure.

Turning for a moment to FIG. 5, yet an alternative approach taken by some embodiments is presented. FIG. 5 illustrates an example of snapshot segmentation, shown generally as 500, according to some aspects of the present disclosure. In this approach, optical character recognition (OCR) or other visual processing is used to determine regions that contain information that should be considered to be combined in segments.

In the example of FIG. 5, the web page 502 has several regions labeled 504 through 514. Regions 504, 508, 510, 512, and 514 contain information that can be recognized by an OCR process, while region 506 and other unlabeled areas contain whitespace.

When the entire page is put through an OCR process, the regions 504, 508, 510, 512, and 514 will show up as containing information recognized by the OCR process along with their various bounding boxes, represented by the lines delineating the regions. The OCR process also identifies the locations of the bounding boxes on the web page. OCR processes that work as described are known and any such processes can be used in the embodiments of the present disclosure that utilize this method of segmentation.

In one embodiment, each of the bounding boxes are treated as a separate segment. In another embodiment, the whitespace between bounding boxes is evaluated and if the whitespace is below a threshold amount, the corresponding bounding boxes are grouped together in the same segment. For example, the amount of whitespace in region 506 is evaluated and if the amount of whitespace between region 504 and regions 508, 510, and 512 is less than a threshold amount, the regions 504, 508, 510, and 512 are combined into the same segment. Otherwise, they are different segments. From a horizontal perspective, the whitespace between the regions 508, 510, and/or 512 can determine whether they should be separate segments or combined into one or more segments using the same whitespace thresholding technique. If both vertical and horizontal whitespace are checked, the vertical and horizontal thresholds need not be the same.

As yet another option, information from the DOM can be used to help identify how the image snapshot should be broken into segments. For example, the DOM can identify regions in the image snapshot that are to be filled with images or other visual information. Thus, anchor tags or other information can identify regions in the image snapshot. The image snapshot can then be segmented by the regions thus identified in the DOM. This option is illustrated by dashed line 320 of FIG. 3.

The methods above for segmentation can be used alone, or two or more methods can be combined in any combination.

Each of the processes for segmentation described above can be performed in the original colors of the image snapshot, or the image snapshot can be converted to different colors, such as black and white using techniques that are known.

Returning now to FIG. 3, once segmentation of the image snapshot is performed in operation 306, operation 308 extracts information from a subset (all or less than all) of the segments. In some embodiments, all the segments are used. In other embodiments only those segments within a threshold distance from the top of the image snapshot are used.

Visual extraction can be any desired extraction technique to extract image from the visual content in the web page. In some examples, OCR is performed on the segments in order to extract information from the snapshot. In other examples, a trained machine learning model can be used to extract information from the segment. For example, visual recognition engines using trained machine learning models can automatically caption images, identifying the content of the images. There are known methods for such visual recognition and any such methods can be used in conjunction with the embodiments of the present disclosure.

If the snapshot contains other visual information such as video or contains audio, other extraction methods can be used. For example, speech to text can be used on the audio track of the video or on audio. Visual processing, such as OCR and/or using a trained machine learning method such as that described above can extract visual information from frames in the video.

At the end of operation 308, content associated with one or more segments will have been extracted. Additionally, since the segmentation operation 306 knows the location and/or boundaries of each segment, the location of the extracted information in the image is also known.

The HTML processing path will now be explained. This path begins at operation 310 where the HTML, such as the HTML DOM is extracted from the web page 302.

Operation 312 extracts information from the DOM. First all the anchor tags are extracted from the HTML source. Validation checks can be performed to ensure that the anchor tags that have been extracted are well formed and/or meet some other type of criteria.

The text, URLs, xpath, and/or other information of all anchor tags are also extracted.

Operation 314 performs a block matching operation to produce a set of visual blocks. This operation matches the segments with the extracted HTML information. Using the xpath of the anchor tag, all visually similar anchor tags are extracted and assembled into a visual block. The visual block is created by using a nearest neighbor matching process. In this process the segment that is the nearest neighbor to the anchor tag and nodes at the same xpath level are matched together. Such matching can be performed by a trained neural network, normal edit distance, calculation, or any other way.

The result is a set of visual blocks that comprise the visually extracted information from the segment and the corresponding extracted HTML information.

Operation 316 performs the remaining operations to create the annotations. For example, operations such as correction, relevance checking, filtering, ranking, final selection, and/or other operations of the visually similar blocks can be performed.

Correction includes correcting visually extracted information based on HTML extracted information. For example, suppose that a segment of the web page to 123-Flowers.com contained a list of links and/or other controls such as "Deals, Next Day Flowers, Autumn Flowers, Birthday, Plants, and Choose Occasion." After identifying the segment (operation 304) and using OCR to visually extract the information in the image (operation 308), the resultant extracted information contained several recognition errors, such as "Dels, nextdy flowers, autumnflowers," and so forth.

When the segment is matched to the extracted HTML information in a visual block, the proper spelling of the text can be identified. Thus, the image segment can identify importance of a segment based on its location and the HTML can identify how to correct any visually extracted information in this example. The correction can be performed based on edit distance. A trained neural network can detect edit distance and the neural network can be trained to identify edit distance based on matching anchor tags and nodes at the same xpath level with a segment location on the web page. Additionally, or alternatively, normal edit distance based calculation, or any other method can be used.

Relevance checking includes identifying items that are relevant and separating them from items that are not relevant to creating annotations. As discussed herein, information at the top of the page contains both information that the publisher considers to be relevant and information that is located toward the top of the page simply for convenience and usability of the web page. Relevance checking is designed to identify which visual blocks contain relevant information and which should be eliminated as not relevant. Visual blocks related to things like branding information, searching the publisher's site, user account login, legal disclaimers or other such information, and so forth are located at the top of the page simply for user convenience or other reasons. They do not tend to contain information that should be included in an annotation.

Relevance checking examines the content of the visual blocks and separates them into relevant and not-relevant categories. The proper category can be identified by identifying whether the information of a visual block contains terms that are determined to be related to things like branding information, searching the publisher's site, user account login, legal disclaimers or other such information, and so forth can be marked as not relevant. Additionally, or alternatively visual block that contain semantically similar to visual blocks containing such terms can also be marked as not relevant. Numerous methods are known for both term searching and determining semantic similarity and they need not be recounted in this disclosure.

Filtering is designed to exclude visual blocks that fall into the not relevant category of information so that only information the publisher considers relevant will be left. Additionally, or alternatively, filtering can remove parts of lists and so forth to allow an annotation to fit into a designated length or meet other desired parameters.

Ranking and final selection can be performed when competing annotations are left and some number of visual blocks need to be eliminated to meet length or other criteria. Ranking and final selection can be based on any criteria.

Annotations are assembled from the remaining visual blocks by taking the corrected information of the visual blocks and using it as the annotation.

Example Machine Architecture and Machine-Readable Medium

Figure 6:
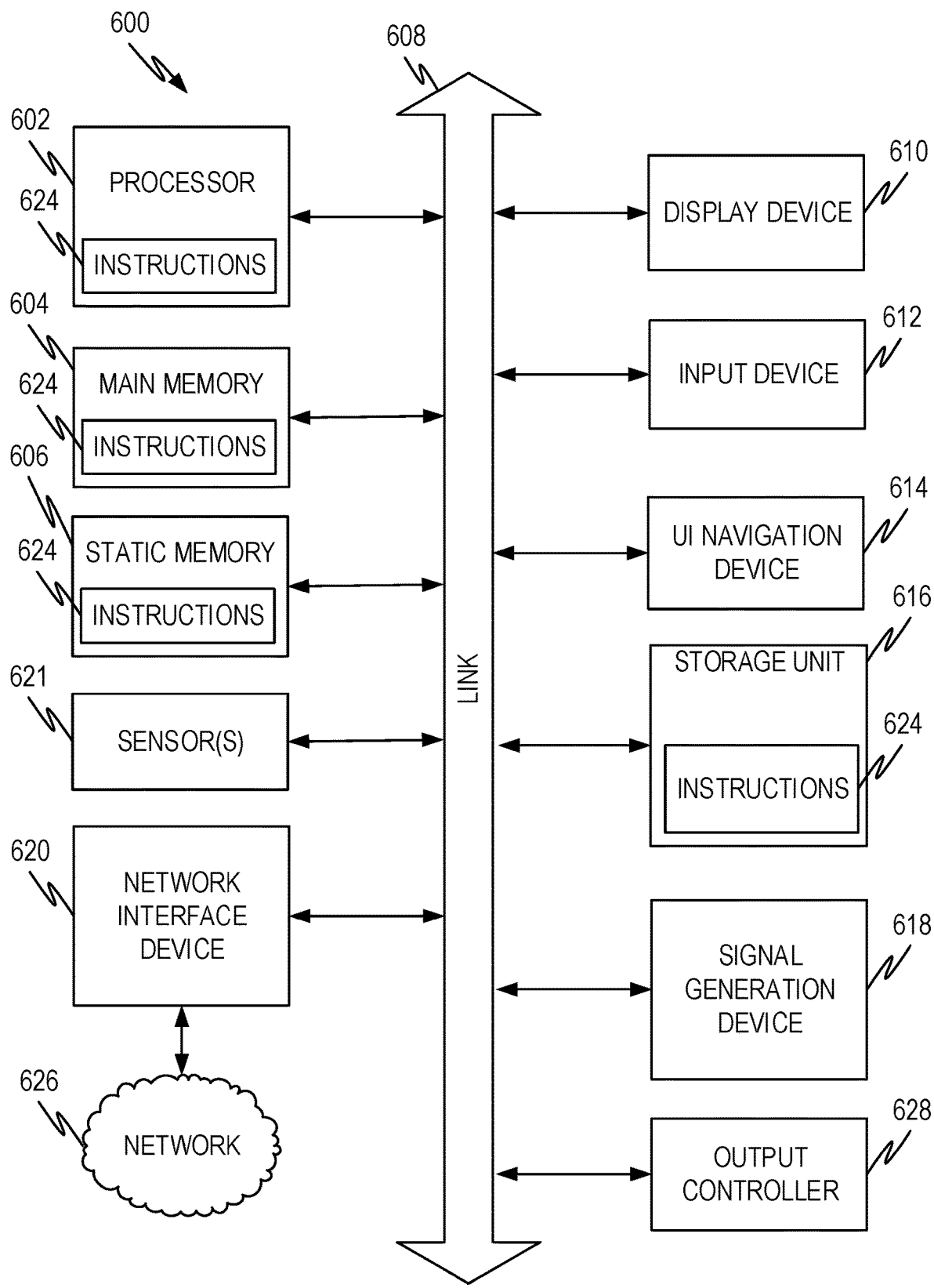
FIG. 6 illustrates a representative architecture for implementing the systems and other aspects disclosed herein or for executing the methods disclosed herein.

FIG. 6 illustrates a representative machine architecture suitable for implementing the systems and so forth or for executing the methods disclosed herein. The machine of FIG. 6 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 6 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), or combinations thereof), one or more memories such as a main memory 604, a static memory 606, or other types of memory, which communicate with each other via link 608. Link 608 may be a bus or other type of connection channel. The machine 600 may include further optional aspects such as a graphics display unit 610 comprising any type of display. The machine 600 may also include other optional aspects such as an alphanumeric input device 612 (e.g., a keyboard, touch screen, and so forth), a user interface (UI) navigation device 614 (e.g., a mouse, trackball, touch device, and so forth), a storage unit 616 (e.g., disk drive or other storage device(s)), a signal generation device 618 (e.g., a speaker), sensor(s) 621 (e.g., global positioning sensor, accelerometer(s), microphone(s), camera(s), and so forth), output controller 628 (e.g., wired or wireless connection to connect and/or communicate with one or more other devices such as a universal serial bus (USB), near field communication (NFC), infrared (IR), serial/parallel bus, etc.), and a network interface device 620 (e.g., wired and/or wireless) to connect to and/or communicate over one or more networks 626.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for in-application search, comprising:
accessing a web page;
extracting from the web page a plurality of HTML snippets;
capturing a visual snapshot of the web page;
segmenting the visual representation into a plurality of visual segments;
extracting information from a subset of the plurality of visual segments based on one or more extraction mechanisms;
correlating the information extracted from the plurality of visual segments with a corresponding HTML snippet;
filtering the correlated information to obtain a subset of the correlated information; and
assembling the subset into an annotation for the web page.

Example 2

The method of example 1 further comprising:
correcting information extracted from a visual segment based on information from the corresponding HTML snippet.

Example 3

The method of example 1 or 2 wherein the one or more extraction mechanisms comprises optical character recognition of text within the visual segment.

Example 4

The method of example 1, 2, or 3 wherein a visual segment comprises video information.

Example 5

The method of example 4 wherein the one or more extraction mechanisms further comprise speech to text transcription of an audio track of the video information.

Example 6

The method of example 4 wherein the one or more extraction mechanisms further comprise optical character recognition of a subset of the video information.

Example 7

The method of example 1, 2, 3, 4, 5, or 6 wherein segmenting the visual representation into a plurality of visual segments comprises:
determining an amount of white space between a current visual segment and a previous visual segment; and
identifying a new visual segment if the amount of white space exceeds a threshold amount.

Example 8

The method of example 1, 2, 3, 4, 5, 6, or 7 wherein segmenting the visual representation into a plurality of visual segments comprises:
performing optical character recognition on a subset of the snapshot; and
identifying visual segments based on the locations of text identified by the optical character recognition.

Example 9

The method of example 8 wherein the extracting information from each of the plurality of visual segments comprises the text identified by the optical character recognition for the corresponding visual segment.

Example 10

The method of example 1, 2, 3, 4, 5, 6, 7, 8, or 9 wherein the information extracted from the plurality of visual segments comprises a link to another web page and wherein the annotation comprises popular links including the link.

Example 11

The method of example 1, 2, 3, 4, 5, 6, 7, 8, 9, or 10 wherein the filtering checks the relevance of the correlated information and removes correlated information falling into an identified category.

Example 12

The method of example 11 wherein the identified category comprises one or more of:
branding;
search;
user account login; and
legal disclaimers.

Example 13

The method of example 1, 2, 3, 4, 5, 6, 7, 8, 9, 10, 11, or 12 wherein correlating the information extracted from the plurality of visual segments with the corresponding HTML snippet comprises matching the visual segment that is the nearest neighbor to an anchor tag at a same xpath level in the corresponding HTML snippet.

Example 14

An apparatus comprising means to perform a method as in any preceding example.

Example 15

Machine-readable storage including machine-readable instructions, when executed, to implement a method or realize an apparatus as in any preceding example.

Example 16

A method for in-application search, comprising:
accessing a web page;
extracting from the web page a plurality of HTML snippets;
capturing a visual snapshot of the web page;
segmenting the visual representation into a plurality of visual segments;
extracting information from a subset of the plurality of visual segments based on one or more extraction mechanisms;
correlating the information extracted from the plurality of visual segments with a corresponding HTML snippet;
filtering the correlated information to obtain a subset of the correlated information; and
assembling the subset into an annotation for the web page.

Example 17

The method of example 16 further comprising:
correcting information extracted from a visual segment based on information from the corresponding HTML snippet.

Example 18

The method of example 16 wherein the one or more extraction mechanisms comprises optical character recognition of text within the visual segment.

Example 19

The method of example 16 wherein a visual segment comprises video information.

Example 20

The method of example 19 wherein the one or more extraction mechanisms further comprise speech to text transcription of an audio track of the video information.

Example 21

The method of example 19 wherein the one or more extraction mechanisms further comprise optical character recognition of a subset of the video information.

Example 22

The method of example 16 wherein segmenting the visual representation into a plurality of visual segments comprises:
determining an amount of white space since a previous visual segment; and
identifying a new visual segment if the amount of white space exceeds a threshold amount.

Example 23

The method of example 16 wherein segmenting the visual representation into a plurality of visual segments comprises:
performing optical character recognition on a subset of the snapshot; and
identifying visual segments based on the locations of text identified by the optical character recognition.

Example 24

The method of example 23 wherein the extracting information from each of the plurality of visual segments comprises the text identified by the optical character recognition for the corresponding visual segment.

Example 25

The method of example 16 wherein the information extracted from the plurality of visual segments comprises a link to another web page and wherein the annotation comprises popular links including the link.

Example 26

A system comprising a processor and computer executable instructions, that when executed by the processor, cause the system to perform operations comprising:
accessing a web page;
extracting from the web page a plurality of HTML snippets;
capturing a visual snapshot of the web page;
segmenting the visual representation into a plurality of visual segments;
extracting information from a subset of the plurality of visual segments based on one or more extraction mechanisms;
correlating the information extracted from the plurality of visual segments with a corresponding HTML snippet;
filtering the correlated information to obtain a subset of the correlated information; and
assembling the subset into an annotation for the web page.

Example 27

The system of example 26 further comprising:
correcting information extracted from a visual segment based on information from the corresponding HTML snippet.

Example 28

The system of example 26 wherein the one or more extraction mechanisms comprises optical character recognition of text within the visual segment.

Example 29

The system of example 26 wherein a visual segment comprises video information.

Example 30

The system of example 29 wherein the one or more extraction mechanisms further comprise speech to text transcription of an audio track of the video information.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for constructing a search result that is presented on a display of a client computing device, the method comprising:
   accessing a web page;
   extracting an HTML snippet from HTML of the web page;
   rendering the web page to generate a visual representation of the web page;
   segmenting the visual representation into a plurality of visual segments;
   extracting information from a visual segment in the visual segments;
   matching the information extracted from the visual segment with the HTML snippet extracted from the HTML of the web page to form a visual block, wherein the visual block comprises the information extracted from the visual segment and the HTML snippet extracted from the HTML of the web page;
   and
   selecting at least a portion of the visual block as an annotation for the web page, wherein upon the web page being identified by a search engine as being relevant to a query received from a user of the client computing device, the search result is returned to the client computing device, wherein the search result includes the annotation for the web page and a link to the web page.

2. The method of claim 1 further comprising:
   correcting information extracted from the visual segment based on the HTML snippet.

3. The method of claim 1 wherein extracting the information from the visual segment comprises performing optical character recognition of text within the visual segment.

4. The method of claim 1 wherein the visual segment comprises video information.

5. The method of claim 4 wherein extracting the information from the visual segment comprises performing speech to text transcription of an audio track of the video information.

6. The method of claim 4 wherein extracting the information from the visual segment further comprises performing optical character recognition over a subset of the video information.

7. The method of claim 1 wherein segmenting the visual representation into a plurality of visual segments comprises:
   determining an amount of white space between a current visual segment and a previous visual segment; and
   identifying a new visual segment based upon the amount of white space exceeding a threshold amount.

8. The method of claim 1 wherein segmenting the visual representation into a plurality of visual segments comprises:
   performing optical character recognition on a subset of the visual representation; and
   identifying visual segments based on the locations of text identified by the optical character recognition.

9. The method of claim 8 wherein extracting information from the visual segment comprises extracting the text identified by the optical character recognition.

10. The method of claim 1 wherein the information extracted from the of visual segment comprises a link to another web page and wherein the annotation comprises the link.

11. A system comprising a processor and memory, wherein the memory has computer executable instructions stored therein, wherein the computer executable instructions, when executed by the processor, cause the processor to perform operations comprising:
    accessing a web page;
    extracting a snippet from HTML of the web page;
    rendering the web page to generate a visual representation of the web page;
    segmenting the visual representation into a plurality of visual segments;
    extracting information from a visual segment in the plurality of visual segments;
    matching the information extracted from the visual segment with the HTML snippet extracted from the HTML of the web page to form a visual block, wherein the visual block comprises the information extracted from the visual segment and the HTML snippet extracted from the HTML of the web page;
    and
    selecting at least a portion of the visual block as an annotation for the web page, wherein upon the web page being identified by a search engine as being relevant to a query received from a user of a client computing device, the search result is returned to the client computing device, wherein the search result includes the annotation for the web page and a link to the web page.

12. The system of claim 11 further comprising:
    correcting information extracted from the visual segment based on information from the HTML snippet, wherein the visual block includes the corrected information.

13. The system of claim 11 wherein one or more extraction mechanisms is employed to extract the information from the visual segment, the one or more extraction mechanisms comprises optical character recognition of text within the visual segment.

14. The system of claim 11 wherein the visual segment comprises video information.

15. The system of claim 14 wherein one or more extraction mechanisms is employed to extract the information from the visual segment, the one or more extraction mechanisms comprises speech to text transcription of an audio track of the video information.

16. The system of claim 14 wherein one or more extraction mechanisms is employed to extract the information from the visual segment, the one or more extraction mechanisms comprises optical character recognition of a subset of the video information.

17. The system of claim 11 wherein segmenting the visual representation into the plurality of visual segments comprises:
    determining an amount of white space since a previous visual segment; and
    identifying a new visual segment based upon the amount of white space exceeding a threshold amount.

18. The system of claim 11 wherein segmenting the visual representation into a plurality of visual segments comprises:
    performing optical character recognition on a subset of the visual representation; and
    identifying visual segments based on the locations of text identified by the optical character recognition.

19. A computer storage medium comprising executable instructions that, when executed by a processor of a machine, cause the machine to perform operations comprising:
    accessing a web page;
    extracting an HTML snippet from HTML of the web page;

rendering the web page to generate a visual representation of the web page;
segmenting the visual representation into a plurality of visual segments;
extracting information from a visual segment in the plurality of visual segments using optical character recognition;
matching the information extracted from the visual segment with the HTML snippet extracted from the HTML of the web page to form a visual block, wherein the visual block comprises the information extracted from the visual segment and the HTML snippet extracted from the HTML of the web page;
identifying and correcting an error in the extracted information based on the HTML snippet matched to the extracted information in the visual block; and
subsequent to the error being identified and corrected, selecting at least a portion of the visual block as an annotation for the web page, wherein upon the web page being identified by a search engine as being relevant to a query received from a user of a client computing device, the search result is returned to the client computing device, wherein the search result includes the annotation for the web page and a link to the web page.

20. The computer storage medium of claim 19, wherein matching the information extracted from the visual segment with the HTML snippet extracted from the HTML of the web page to form the visual block comprises extracting several anchor tags from the HTML snippet based upon an xpath of an anchor tag in the HTML snippet, wherein the several anchor tags are visually similar to the anchor tags, wherein the several anchor tags are assembled into the visual block.

\* \* \* \* \*